US012758913B2

(12) United States Patent
Seki et al.

(10) Patent No.: US 12,758,913 B2
(45) Date of Patent: Oct. 13, 2026

(54) FILTER PACK AND AIR FILTER PROVIDED WITH SAME

(71) Applicant: NIPPON MUKI CO., LTD., Tokyo (JP)

(72) Inventors: Kazuya Seki, Tochigi (JP); Takumu Jinguuji, Ibaraki (JP); Shiro Hayashi, Ibaraki (JP)

(73) Assignee: NIPPON MUKI CO., LTD., Tokyo (JP)

( * ) Notice: Subject to any disclaimer, the term of this patent is extended or adjusted under 35 U.S.C. 154(b) by 411 days.

(21) Appl. No.: 18/284,932

(22) PCT Filed: Mar. 29, 2022

(86) PCT No.: PCT/JP2022/015356
§ 371 (c)(1),
(2) Date: Sep. 29, 2023

(87) PCT Pub. No.: WO2022/215590
PCT Pub. Date: Oct. 13, 2022

(65) Prior Publication Data
US 2024/0181378 A1 Jun. 6, 2024

(30) Foreign Application Priority Data
Apr. 9, 2021 (JP) ................................ 2021-066458

(51) Int. Cl.
*B01D 46/52* (2006.01)
*B01D 46/00* (2022.01)

(52) U.S. Cl.
CPC ....... *B01D 46/523* (2013.01); *B01D 46/0002* (2013.01)

(58) Field of Classification Search
CPC .. B01D 46/523; B01D 46/0002; B01D 46/10; B01D 46/522
See application file for complete search history.

(56) References Cited

U.S. PATENT DOCUMENTS 5,071,555 A * 12/1991 Enbom .................. B01D 46/10 210/493.5
5,084,178 A * 1/1992 Miller .................. B01D 46/521 210/493.1

(Continued)

FOREIGN PATENT DOCUMENTS

JP 2003284914 A * 10/2003
JP 2020-62610 4/2020

(Continued)

OTHER PUBLICATIONS

International Search Report issued in International Patent Application No. PCT/JP2022/015356, dated Jun. 21, 2022.

*Primary Examiner* — Dung H Bui
(74) *Attorney, Agent, or Firm* — GREENBLUM & BERNSTEIN, P.L.C.

(57) ABSTRACT

The filter pack incudes a filter medium having folds alternately repeated on upstream and downstream sides of airflow by a pleating process, at least one pair of upstream ventilation surfaces facing each other via the fold on the downstream side therebetween and into which the airflow flows, and at least one pair of downstream ventilation surfaces facing each other via the fold on the upstream side therebetween and from which the airflow flows out, and a plurality of space maintaining members formed on each of the upstream ventilation surfaces and each of the downstream ventilation surfaces to maintain spaces of each pair of upstream ventilation surfaces and each pair of downstream ventilation surfaces. The plurality of space maintaining members formed on the upstream ventilation surfaces are intermittently formed in a direction orthogonal to the fold.

7 Claims, 5 Drawing Sheets

(56) References Cited

U.S. PATENT DOCUMENTS

| | | | | |
|---|---|---|---|---|
| 5,914,414 | A * | 6/1999 | Taomo | B01D 46/66 55/497 |
| 8,597,393 | B2 * | 12/2013 | Morita | B01D 46/523 55/521 |
| 2005/0138905 | A1 * | 6/2005 | Kubokawa | B01D 46/521 55/497 |
| 2008/0067121 | A1 * | 3/2008 | Ter Horst | B01D 46/521 210/493.1 |
| 2012/0073254 | A1 * | 3/2012 | Konno | B01D 46/121 55/497 |
| 2012/0223009 | A1 * | 9/2012 | Mbadinga-Mouanda | B01D 39/14 493/405 |
| 2016/0067647 | A1 * | 3/2016 | Tate | B01D 46/523 156/219 |
| 2021/0387128 | A1 * | 12/2021 | Izumiya | B01D 46/10 |
| 2023/0249117 | A1 * | 8/2023 | Seki | B01D 46/523 55/497 |

FOREIGN PATENT DOCUMENTS

| | | |
|---|---|---|
| JP | 2021-159872 | 10/2021 |
| WO | 2022/014466 | 1/2022 |

* cited by examiner

FILTER PACK AND AIR FILTER PROVIDED WITH SAME

TECHNICAL FIELD

The present invention relates to a filter pack including a pleated filter medium and an air filter including the filter pack.

BACKGROUND ART

Conventionally, a filter pack in which space maintaining members are formed in a pleated filter medium so that pleat spaces are kept uniform has been known. For example, PTL 1 discloses a filter pack in which spaces are maintained by contact between space maintaining members that face each other.

CITATION LIST

Patent Literature

PTL 1: JP2020-062610A

SUMMARY OF INVENTION

Technical Problem

The space maintaining member has an effect of maintaining the pleat spaces of the filter pack, but increases the pressure loss due to covering the ventilation surface of the filter medium. In addition, in order to bring the space maintaining members into contact with each other, if the positional and dimensional accuracy is not obtained when forming the space maintaining members and when performing the pleating process, the space maintaining members do not contact each other, and as a result, the pleat spaces may not be kept uniform.

The invention has been made in consideration of such circumstances, and an object of the invention is to provide a filter pack capable of suitably maintaining pleat spaces while suppressing an increase in pressure loss, and an air filter including the filter pack.

Solution to Problem

In order to solve the above-mentioned problem, the filter pack of the present disclosure includes a filter medium collecting fine particles in a gas and the filter medium comprising folds alternately repeated on an upstream side and on a downstream side of airflow by a pleating process, at least one pair of upstream ventilation surfaces which face each other via the fold on the downstream side therebetween and into which the airflow flows, and at least one pair of downstream ventilation surfaces which face each other via the fold on the upstream side therebetween and from which the airflow flows out, and a plurality of space maintaining members formed on each of the upstream ventilation surfaces and each of the downstream ventilation surfaces to maintain spaces of each pair of upstream ventilation surfaces and each pair of downstream ventilation surfaces, and the plurality of space maintaining members formed on the upstream ventilation surfaces are intermittently formed in a direction orthogonal to the fold, and at least one of the space maintaining members formed on one side of the pair of upstream ventilation surfaces is in contact at two or more places with at least one of the space maintaining members formed on the other side of the pair of upstream ventilation surfaces.

Advantageous Effects of Invention

In the filter pack and the air filter including the filter pack according to the invention, it is possible to suitably maintain the pleat spaces while suppressing an increase in pressure loss.

DESCRIPTION OF EMBODIMENTS

Embodiments of a filter pack and an air filter according to the invention will be described with reference to the accompanying drawings.

Figure 1:
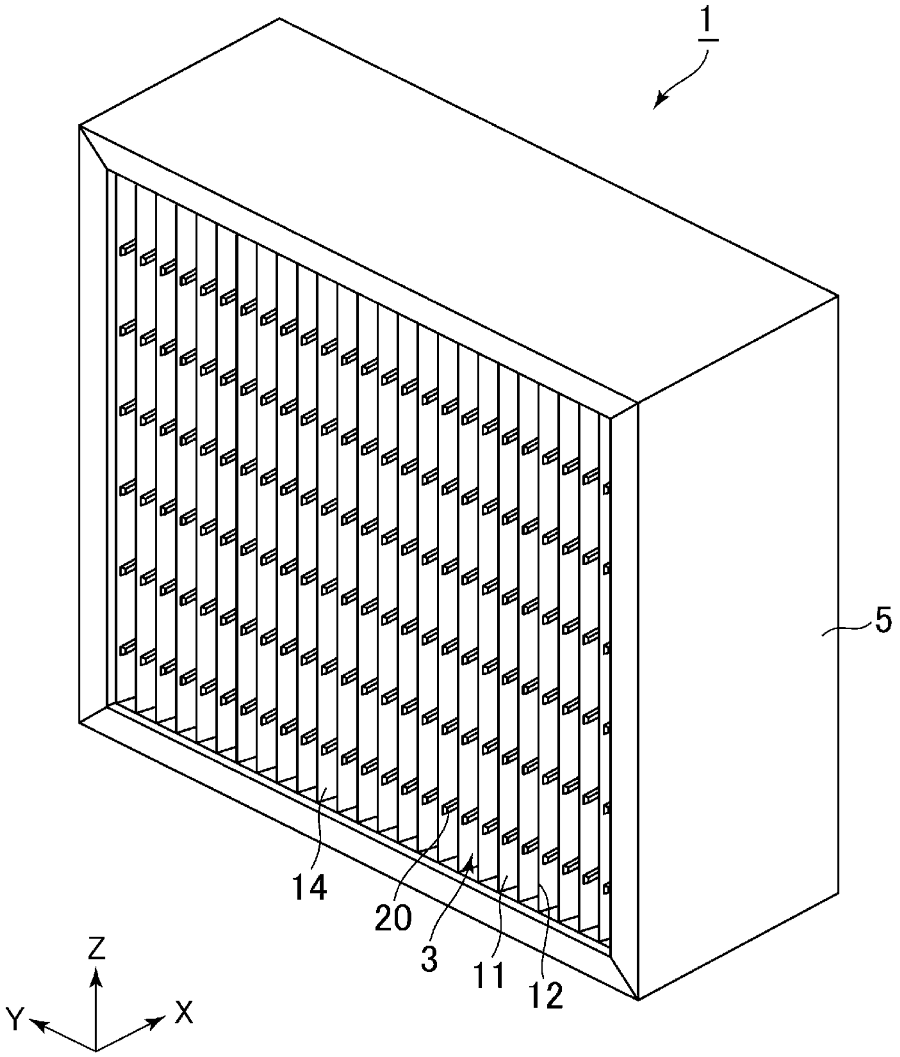
FIG. 1 is an external perspective view showing an air filter that is an embodiment of an air filter of the invention.

FIG. 1 is an external perspective view showing an air filter 1 that is an embodiment of the air filter of the invention.

Figure 2:
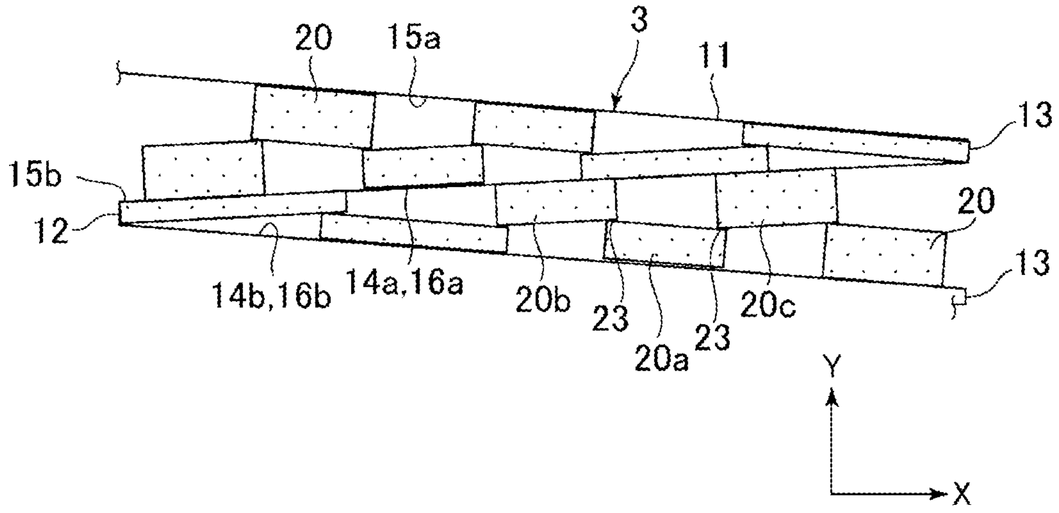
FIG. 2 is a view showing a portion of a folded filter pack as viewed in a direction in which folds of pleats extend.

FIG. 2 is a view showing a portion of a filter pack 3 that is folded as viewed in a direction in which folds 12 and 13 of pleats extend (upper view).

Figure 3:
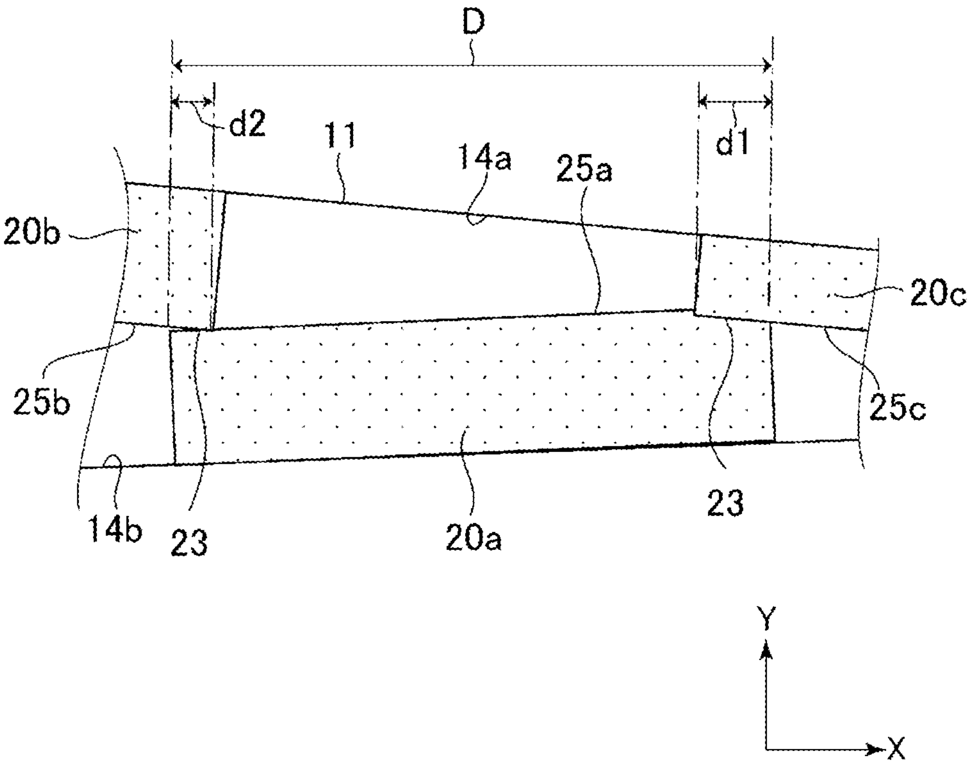
FIG. 3 is a partially enlarged view of FIG. 2.

FIG. 3 is a partially enlarged view of FIG. 2.

The air filter 1 has the filter pack 3 and a frame 5. The frame 5 surrounds the filter pack 3 so that the folds 12 and 13 of a filter medium 11 of the filter pack 3 are arranged on upstream and downstream sides in a direction of airflow (X direction) passing through the filter medium 11. In the present embodiment, for the sake of convenience, a fold located on the upstream side of the airflow (−X direction) is referred to as the fold 12, and a fold located on the downstream side of the airflow (+X direction) is referred to as the fold 13. The filter pack 3 has the filter medium 11 and a plurality of space maintaining members 20.

The filter medium 11 is a member that collects fine particles in a gas. The filter medium 11 is used to remove, for example, dust having a particle diameter of 2.5 μm or less at a concentration of 0.3 $mg/m^3$ or less. The filter medium 11 has, for example, a collection efficiency of 80% or more according to a counting method, a pressure loss of 79 to 493 Pa, and a dust holding capacity (dust holding amount) of 200 to 800 $g/m^2$. In the counting method, measurement is performed by allowing air containing particles of any of atmospheric dust, polyalphaolefin (PAO), and silica having a particle diameter of 0.3 μm to pass therethrough. The dust holding capacity is the amount of dust collected by the filter until a given final pressure loss is reached. In addition, the filter medium 11 may also be, for example, a filter medium for a HEPA filter, a filter medium for a ULPA filter, or a filter medium for a gas removal filter.

The filter medium 11 is, for example, a fibrous body made of a glass fiber, an organic fiber, or a mixed fiber of these fibers, and is, for example, a nonwoven fabric or felt. The filter medium 11 made of a glass fiber is produced, for example, by papermaking with a wet method or a dry method. The filter medium 11 made of an organic fiber is produced, for example, by a spun-bond method, a melt-blow method, a thermal bond method, a chemical bond method, or the like. In addition, the filter medium 11 may be, for example, a laminate of a plurality of nonwoven fabrics having different collection efficiencies.

The filter medium 11 is subjected to a pleating process into an approximate V shape so that mountain folds and valley folds are alternately repeated. The pleating process is performed using a reciprocating-type or rotary-type folding machine or the like. The filter medium 11 has the folds 12 and 13 parallel to each other on the upstream and downstream sides of the airflow due to the pleating process. Further, the filter medium 11 has a plurality of pairs of ventilation surfaces 14 (ventilation surfaces 14*a* and 14*b*) that are continuous with the fold 12 or 13 therebetween and face each other approximately in a Y direction.

Specifically, the ventilation surface 14 has a plurality of (at least one) pairs of upstream ventilation surfaces 15*a* and 15*b* and pairs of downstream ventilation surfaces 16*a* and 16*b*. The pair of upstream ventilation surfaces 15*a* and 15*b* are ventilation surfaces 14 which face each other via the fold 13 on the downstream side therebetween and into which airflow flows. The pair of downstream ventilation surfaces 16*a* and 16*b* are ventilation surfaces 14 which face each other via the fold 12 on the upstream side therebetween and from which airflow flows out. Hereinafter, the upstream ventilation surfaces 15*a* and 15*b* and the downstream ventilation surfaces 16*a* and 16*b* are simply referred to as the ventilation surfaces 14 when they are not distinguished from each other.

The space maintaining members 20 are a plurality of members that maintain a space (pleat space) set between the pair of ventilation surfaces 14 of the filter medium 11. The space maintaining members 20 are intermittently formed on the ventilation surfaces 14 in a direction (approximate X direction) orthogonal to a direction along the folds 12 and 13. In FIG. 2, for example, three space maintaining members 20 are intermittently formed on the ventilation surface 14*a*.

At least one space maintaining member 20 formed on one side of the pair of ventilation surfaces 14 is in contact at two or more places with at least one space maintaining member 20 formed on the other side of the pair of ventilation surfaces 14. Specifically, a space maintaining member 20*a* formed on the ventilation surface 14*b* is in contact with a plurality of space maintaining members 20*b* and 20*c* adjacent thereto formed on the ventilation surface 14*a* at two contact places 23, 23.

The space maintaining member 20 formed on one side of the pair of ventilation surfaces 14 has a facing surface 25 facing to the space maintaining member 20 formed on the other side of the pair of ventilation surfaces 14. The facing surface 25 is, for example, a flat tip surface of the space maintaining member 20. As shown in FIG. 3, in a facing surface 25*a* of the space maintaining member 20*a* formed on the ventilation surface 14*b*, a sum of lengths d1 and d2 thereof along an approximate X direction in contact with facing surfaces 25*b* and 25*c* of the space maintaining members 20*b* and 20*c* formed on the ventilation surface 14*a* is preferably 1% or more and 10% or less of a length D along an approximate X direction of the facing surface 25*a*. When it is less than 1%, the contact place 23 is small, and the effect of maintaining the space may be reduced. When it is more than 10%, the dimension of the space maintaining member 20 becomes large, and as a result, the area covering the ventilation surface 14 becomes large, resulting in an increase in pressure loss when the filter is used.

Further, the space maintaining members 20 have different heights (lengths in an approximate Y direction) depending on the pleat space. Specifically, in FIG. 2, the pleat space between the pair of ventilation surfaces 14*a* and 14*b* increases from the fold 12 toward the fold 13, and therefore, the height of the space maintaining member 20 on a fold 12 side is small, and the height of the space maintaining member 20 on a fold 13 side is large.

The space maintaining member 20 is made of, for example, a thermoplastic resin called a hot-melt adhesive. Examples of such a thermoplastic resin include polyamide-based, urethane-based, and olefin-based thermoplastic resins. The space maintaining member 20 is formed, for example, by directly applying a hot-melt adhesive to the filter medium 11 approximately in the X direction of the filter medium 11 using a gun filled with a softened hot-melt adhesive. Further, the space maintaining member 20 may be formed, for example, by adhering a solidified hot-melt adhesive to the filter medium 11 other than direct application. Alternatively, the space maintaining member 20 may be made of other material such as a ceramic.

In such an air filter 1 and a filter pack 3, the space maintaining member 20 formed on one side of the pair of ventilation surfaces 14 is in contact at two places with the space maintaining member 20 formed on the other side of the pair of ventilation surfaces 14. Therefore, in the filter pack 3, the pleat space is easily maintained as compared with the case where it is in contact at one place. That is, when the space maintaining member 20 is in contact only at one place, for example, the space maintaining members 20 arranged on each side of the pair of ventilation surfaces 14 may be out of position due to production errors, and there may be a case where the space maintaining members 20 are not in contact with each other. In this case, the pleat space is not maintained, and the filter efficiency may decrease.

On the other hand, in the air filter 1 and the filter pack 3 of the present embodiment, the space maintaining members 20 are in contact at two places, and therefore, the space maintaining members 20 facing each other can reliably contact each other and are supported at two places. In addition, friction or the like acts at the contact places 23, so that there is also an advantage that the space maintaining members 20 are less likely to be out of position. Therefore, in such a filter pack 3 and an air filter 1, the pleat spaces can be suitably maintained while suppressing an increase in pressure loss.

Although several embodiments are described in the present disclosure, these embodiments are presented as examples and are not intended to limit the scope of the invention. These novel embodiments can be implemented in various other forms, and various omissions, replacements, and changes can be made without departing from the gist of the invention. These embodiments and modifications thereof are included in the scope and gist of the invention, and are also included in the scope of the invention described in the claims and equivalents thereof.

Figure 4:
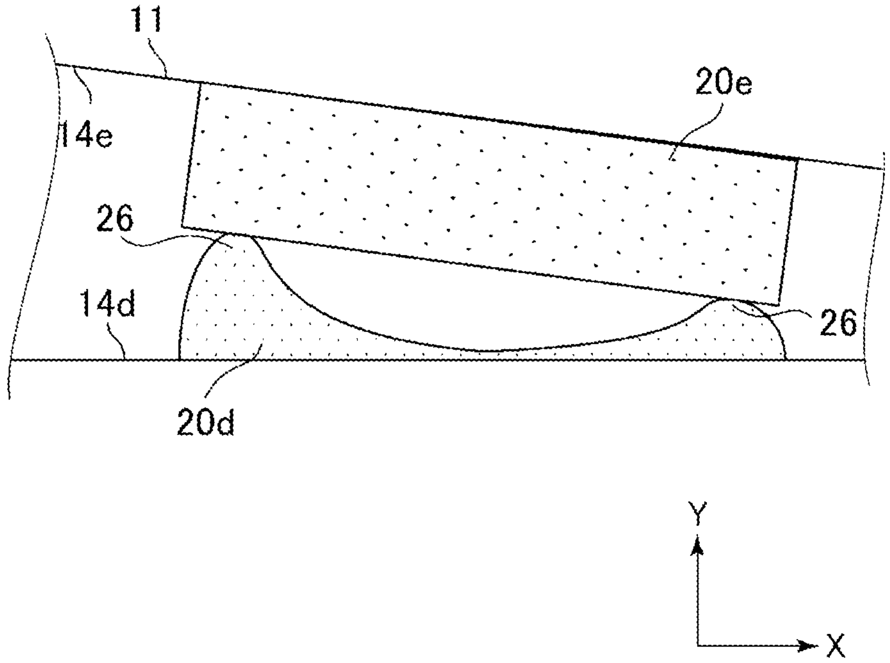
FIG. 4 is a partially enlarged view of a filter pack as a first modification.

For example, in the example of the filter pack 3, an example in which one space maintaining member 20 formed on one side of the pair of ventilation surfaces 14 is in contact at one place with each of the plurality of space maintaining members 20 adjacent thereto formed on the other side of the pair of ventilation surfaces 14 is described. However, one space maintaining member 20 formed on one side of the pair of ventilation surfaces 14 may be in contact at a plurality of places with one space maintaining member 20 formed on the other side of the pair of ventilation surfaces 14. For example, as in a first modification shown in FIG. 4, one space maintaining member 20*d* formed on the other side of a pair of ventilation surfaces 14*d* has protruding shapes 26 protruding in a height direction at two places. A space maintaining member 20*e* formed on one side of a pair of ventilation surfaces 14*e* is in contact at two places by being in contact with the protruding shapes 26 at two places. Note that the number of contact places 23 may be two or more.

Figure 5:
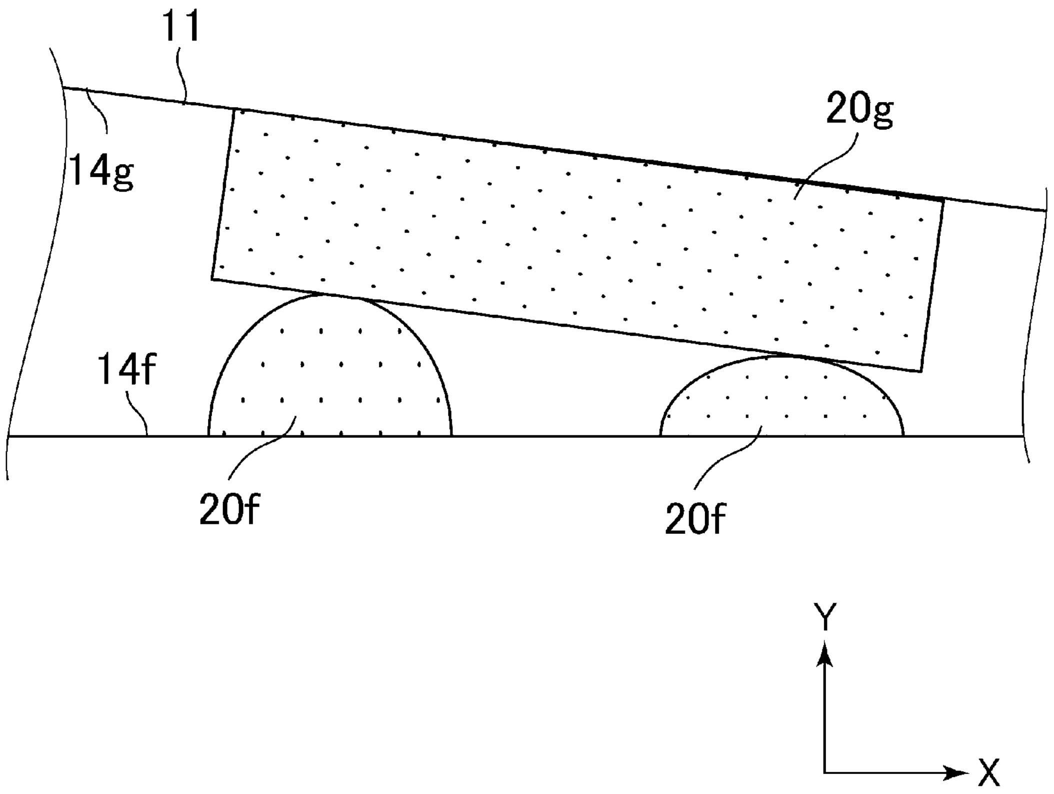
FIG. 5 is a partially enlarged view of a filter pack as a second modification.

Further, as in a second modification shown in FIG. 5, among the space maintaining members 20 formed on a pair of ventilation surfaces 14*f* and 14*g*, a space maintaining member 20*f* formed on one side of the ventilation surface 14*f* may be provided in a dot shape (approximately hemispherical shape) with a short length approximately in the X direction. In this case, a space maintaining member 20*g* formed on the other side of the ventilation surface 14*g* is in contact at two or more places with two or more adjacent space maintaining members 20*f* facing thereto. As in the case of the filter pack in FIG. 4 or 5, when the space maintaining member 20*e* or 20*g* formed on one side of the ventilation surface 14*e* or 14*g* of the pair of ventilation surfaces 14 is supported at two places by at least one space maintaining member 20*d* or 20*f* formed on the other side of the ventilation surface 14*d* or 14*f*, even if the other space maintaining member 20*d* or 20*f* is supported at one place, the filter pack can be included in the scope of the filter pack of the invention.

Further, in the filter pack 3, an example in which the space maintaining members 20 are intermittently formed approximately in the X direction on any of the upstream ventilation surfaces 15*a* and 15*b* and the downstream ventilation surfaces 16*a* and 16*b* is described. However, the space maintaining members 20 may be continuously formed approximately in the X direction on the downstream ventilation surfaces 16*a* and 16*b*.

Figure 6:
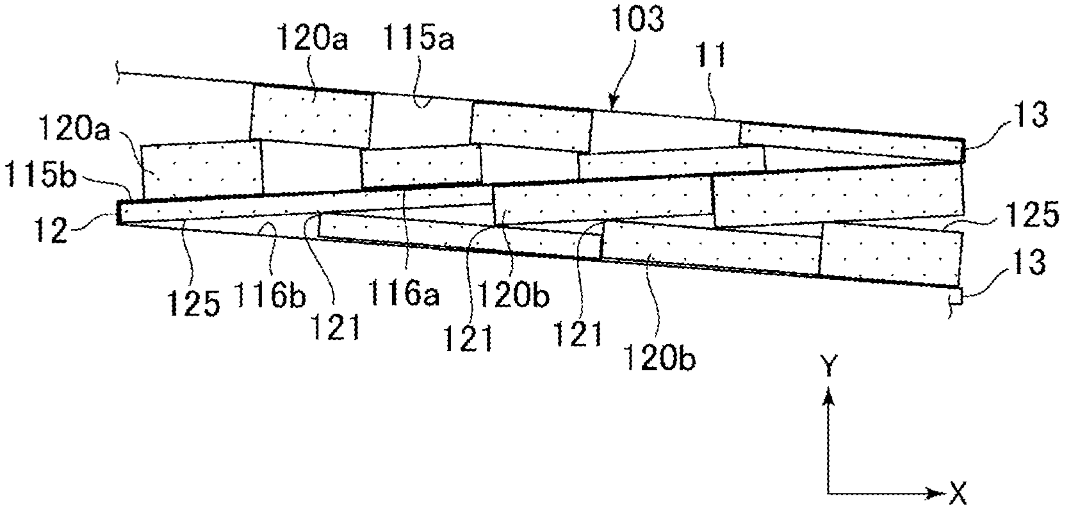
FIG. 6 shows a filter pack as a third modification and is a view showing a portion of the filter pack that is folded as viewed in a direction in which folds of pleats extend.
Figure 7:
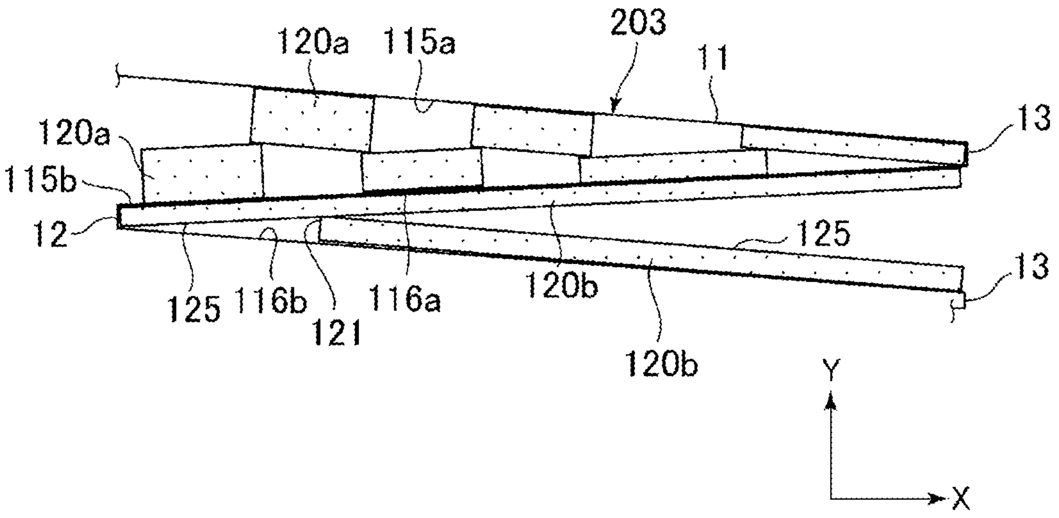
FIG. 7 shows a filter pack as a fourth modification and is a view showing a portion of the filter pack that is folded as viewed in a direction in which folds of pleats extend.

Here, FIG. 6 shows a filter pack 103 as a third modification and is a view showing a portion of the filter pack 103 that is folded as viewed in a direction in which folds of pleats extend. In FIGS. 6 and 7, configurations and parts corresponding to those of the filter pack 3 are denoted by the same reference numerals, and overlapping description will be omitted.

The difference between the filter pack 103 and the filter pack 3 is that space maintaining members 120*b* formed on downstream ventilation surfaces 116*a* and 116*b* are continuously formed, not intermittently, approximately in the X direction. That is, the space maintaining members 120*b* adjacent to each other approximately in the X direction are formed in close contact with each other without forming a gap.

For example, when the filter pack 103 is continuously ventilated, there is a possibility that the internal structure of the filter pack 103 will change even if no change occurs in the external appearance of the filter pack 103. For example, a pair of upstream ventilation surfaces 115*a* and 115*b* of the filter pack 103 may swell toward the outflow side due to the airflow that flows in, which may increase the pleat space between the pair of upstream ventilation surfaces 115*a* and 115*b*.

Therefore, in the filter pack 103, space maintaining members 120*a* and 120*b* are formed so as to increase the strength of the filter medium 11 while taking into account the advantage of suppressing an increase in pressure loss as in the filter pack 3. That is, the space maintaining members 120*a* formed on the upstream ventilation surfaces 115*a* and 115*b* are intermittently formed approximately in the X direction, and the space maintaining members 120*b* formed on the downstream ventilation surfaces 116*a* and 116*b* are continuously formed approximately in the X direction. The space maintaining member 120*b* is in contact with a facing surface 125 of the space maintaining member 120*b* facing thereto at a rise 121 with respect to the downstream ventilation surfaces 116*a* and 116*b* from the upstream side to the downstream side.

As a result, the space maintaining member 120*b* can prevent the pair of upstream ventilation surfaces 115*a* and 115*b* from swelling toward the outflow side while ensuring the ventilation area, so that the pleat space at the start of use can be maintained. Further, since the strength of the filter pack 103 is increased, the stability of the shape is improved even during continuous ventilation, and as a result, an increase in pressure loss can be suppressed.

In the filter pack 103 in FIG. 6, an example in which a plurality of space maintaining members 120*b* are continuously formed approximately in the X direction on the downstream ventilation surfaces 116*a* and 116*b* is described. However, as shown in a filter pack 203 as a fourth modification in FIG. 7, one space maintaining member 120*b* may be formed in an elongated shape over the downstream ventilation surfaces 116*a* and 116*b* approximately in the X direction.

REFERENCE SIGNS LIST

1: air filter
3, 103, 203: filter pack
5: frame
11: filter medium
12, 13: fold
14: ventilation surface
20, 120: space maintaining member
23: contact place
25, 125: facing surface
26: protruding shape

The invention claimed is:

1. A filter pack comprising:

a filter medium collecting fine particles in a gas and the filter medium comprising folds alternately repeated on an upstream side and on a downstream side of airflow by a pleating process, at least one pair of upstream ventilation surfaces which face each other via the fold on the downstream side therebetween and into which the airflow flows, and at least one pair of downstream ventilation surfaces which face each other via the fold on the upstream side therebetween and from which the airflow flows out;

a plurality of space maintaining members formed on each of the upstream ventilation surfaces and each of the downstream ventilation surfaces to maintain spaces of each pair of upstream ventilation surfaces and each pair of downstream ventilation surfaces, wherein the plurality of space maintaining members formed on each of the upstream ventilation surfaces are intermittently formed to be spaced apart from each other in a direction orthogonal to the fold on the downstream side, thereby defining a successive spacing on each of the upstream ventilation surfaces in the direction orthogonal to the fold on the downstream side, wherein the successive spacing is defined by exposed surface regions of each of the upstream ventilation surfaces; and at least one of the space maintaining members formed on one side of the pair of upstream ventilation surfaces is in contact at two or more places with at least one of the space maintaining members formed on the other side of the pair of upstream ventilation surfaces.

2. The filter pack according to claim 1, wherein the plurality of space maintaining members formed on the downstream ventilation surfaces are intermittently formed to be spaced apart from each other in a direction orthogonal to the fold on the upstream side, thereby defining a successive spacing on each of the downstream ventilation surfaces in the direction orthogonal to the fold on the upstream side, wherein the successive spacing is defined by exposed surface regions of each of the downstream ventilation surfaces; and at least one of the space maintaining members formed on one side of the pair of downstream ventilation surfaces is in contact at two or more places with at least one of the space maintaining members formed on the other side of the pair of downstream ventilation surfaces.

3. The filter pack according to claim 1, wherein the plurality of space maintaining members formed on each of the downstream ventilation surfaces are continuously formed in a direction orthogonal to the fold on the upstream side.

4. The filter pack according to claim 1, wherein at least one of the space maintaining members formed on the one side of the pair of upstream ventilation surfaces is in contact at two or more places with the plurality of space maintaining members adjacent thereto formed on the other side of the pair of upstream ventilation surfaces.

5. The filter pack according to claim 1, wherein the plurality of space maintaining members formed on each of the upstream ventilation surfaces or each of the downstream ventilation surfaces have different heights according to the space set between the pair of upstream ventilation surfaces or the pair of downstream ventilation surfaces.

6. The filter pack according to claim 1, wherein each of the space maintaining members formed on the one side of the pair of upstream ventilation surfaces or the one side of the pair of downstream ventilation surfaces has a facing surface facing to each of the space maintaining members formed on the other side of the pair of upstream ventilation surfaces or the other side of the pair of downstream ventilation surfaces, and a sum of lengths of the facing surface along a direction orthogonal to the fold on the downstream side in contact with each of the space maintaining members formed on the other side of the pair of upstream ventilation surfaces or the other side of the pair of downstream ventilation surfaces is 1% or more and 10% or less of a length along a direction orthogonal to the fold on the upstream side of the facing surface.

7. An air filter comprising:

the filter pack according claim 1; and a frame surrounding the filter pack so that the folds of the filter medium of the filter pack are arranged on the upstream and downstream sides of airflow passing through the filter medium.

* * * * *